Aug. 24, 1954

F. H. OWENS 2,687,259

CONTROL AND INDICATOR APPARATUS
FOR REEL-WOUND STRIP MATERIAL

Original Filed March 19, 1949

INVENTOR.
FREEMAN H. OWENS
BY
James and Franklin
ATTORNEYS.

Aug. 24, 1954

F. H. OWENS 2,687,259

CONTROL AND INDICATOR APPARATUS
FOR REEL-WOUND STRIP MATERIAL

Original Filed March 19, 1949

INVENTOR.
FREEMAN H. OWENS
BY
James and Franklin
ATTORNEYS.

Aug. 24, 1954       F. H. OWENS       2,687,259
CONTROL AND INDICATOR APPARATUS
FOR REEL-WOUND STRIP MATERIAL
Original Filed March 19, 1949       4 Sheets-Sheet 3
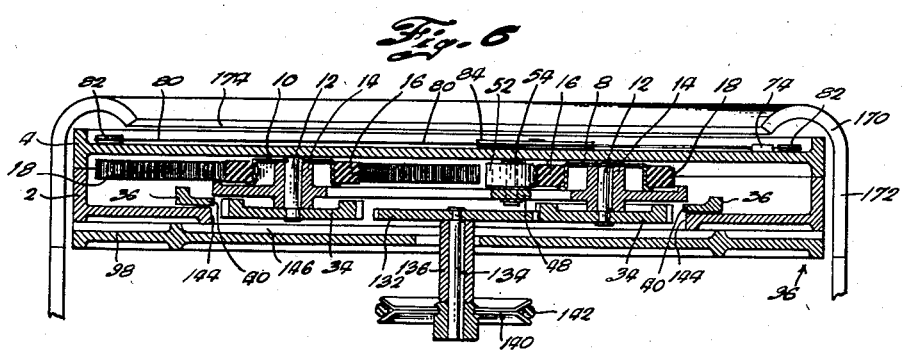
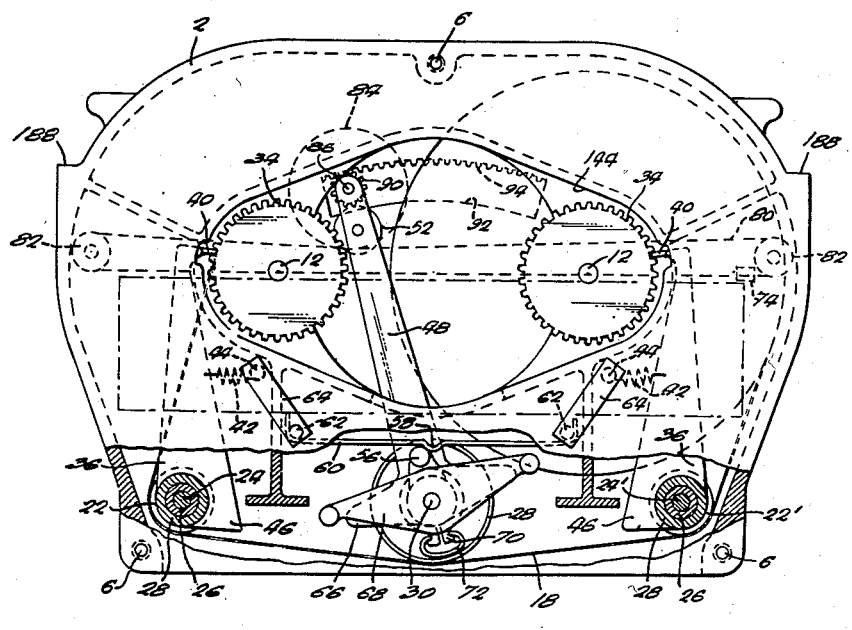
INVENTOR.
FREEMAN H. OWENS
BY
James and Franklin
ATTORNEYS.

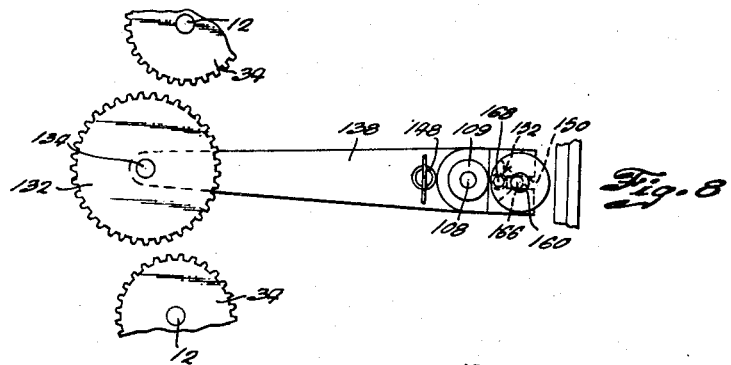
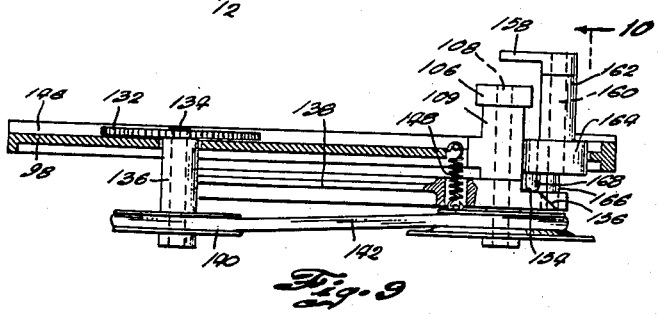
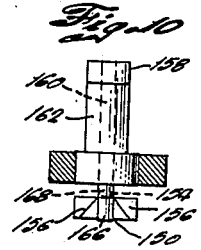
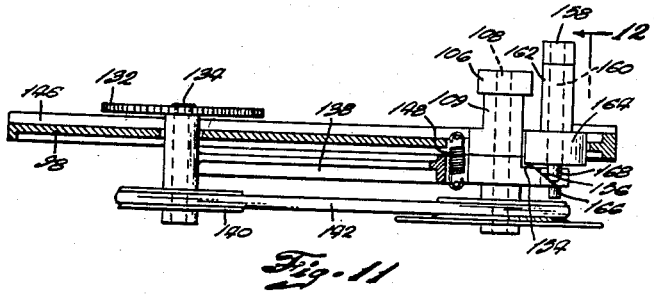
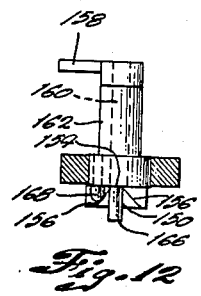
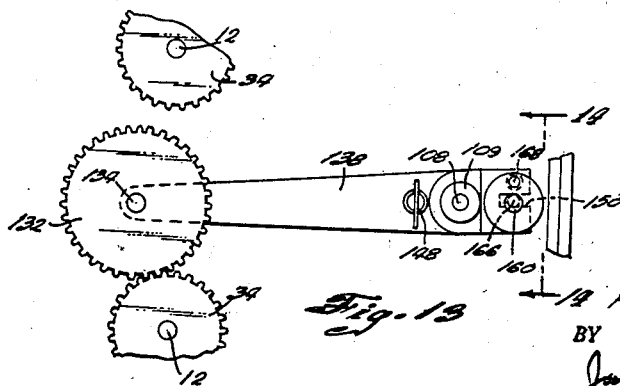
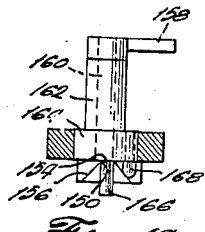

Patented Aug. 24, 1954

2,687,259

UNITED STATES PATENT OFFICE 2,687,259

CONTROL AND INDICATOR APPARATUS FOR REEL-WOUND STRIP MATERIAL

Freeman H. Owens, New York, N. Y.

Original application March 19, 1949, Serial No. 82,464. Divided and this application July 6, 1951, Serial No. 235,438

13 Claims. (Cl. 242—55)

1

The present invention relates to control and indicating apparatus for use with elongated material adapted to be wound from one reel on another, and in particular to such apparatus adapted to be included in a magazine within which the elongated medium is contained.

The invention is here particularly illustrated as embodied in apparatus designed to record and reproduce intelligence on a magnetizable tape but it will be apparent that it is applicable as well to other types of recording and reproducing apparatus, as well as to other types of apparatus in which an elongated medium is wound upon and unwound from a reel.

This application is a division of my application Serial No. 82,464, filed March 19, 1949, and entitled "Transducing Apparatus and Magazine Useable Therewith."

In order to facilitate removal and replacement of the transducing medium, be it tape, wire, film, or the like, from the apparatus, the use of magazines has found widespread acceptance because such magazines eliminate the onerous necessity of threading the medium through the various operative portions of the apparatus and also eliminate the difficult task of securing the free ends of the medium to the spools or other rotated elements upon which they are to be wound. Various problems arise when such magazines are employed, one such problem revolving about the provision of proper control of the apparatus so that winding of the medium from one spool to another is terminated before the medium has completely unwound from one of the spools, since obviously if the medium is permitted to completely unwind, one of the advantages of the magazine type of apparatus, to wit, the lack of necessity of securing the free ends of the tape to the spool, would be obviated. Various expedients have in the past been employed with greater or less success. The present invention provides a construction which is simple and positive in operation and which effectively provides for the automatic and fool-proof attainment of the necessary functions.

When multiple lane transducing is employed, it is most desirable that the transducing medium be drivable in either direction so that it is not necessary to place the magazine on the apparatus in a particular manner depending upon the particular lane to be transduced. The apparatus of the present invention is illustrated and described as adapted for two lane transducing but it will be apparent that any number of lanes may be employed.

2

The prime object of the present invention is to devise a magazine which, in conjunction with appropriately constructed apparatus, positively and efficiently ensures control of the operation of the apparatus so that the magazine may be used with optimum ease and efficiency.

A still further object of the present invention is to devise a novel indicating mechanism for use in the magazine so as to give visual notice to the user of the particular portion of the medium which is being transduced at any given moment.

Another object of the present invention is to so correlate the indicating mechanism and the control mechanism that they function together in an effective and appropriate manner.

To the accomplishment of the foregoing objects and such other objects as may hereinafter appear, the present invention relates to the control and indicating mechanism, and to a magazine in which operative portions of such a mechanism are incorporated, as defined in the appended claims and as described in this specification, taken together with the accompanying drawings in which:

Fig. 6 is a side cross-sectional view taken along the line 6—6 of Fig. 1;

Fig. 7 is a bottom view, partially broken away, of the magazine employed with the apparatus;

Fig. 8 is a schematic view illustrating the mechanism for driving the appropriate take-up spool in the magazine;

Fig. 9 is a side cross-sectional view showing a portion of the driving mechanism in its intermediate non-engaged position;

Fig. 10 is a side cross-sectional view taken along the line 10—10 of Fig. 9;

Fig. 11 is a view similar to Fig. 9 but showing the driving mechanism in one of its operative engaged positions;

Fig. 12 is a side cross-sectional view taken along the line 12—12 of Fig. 11;

Fig. 13 is a schematic view similar to Fig. 8 but showing the driving mechanism in the operative engaged position other than the one illustrated in Fig. 11; and Fig. 14 is a view similar to Fig. 12 but taken along the line 14—14 of Fig. 13.

The magazine

Figure 1:
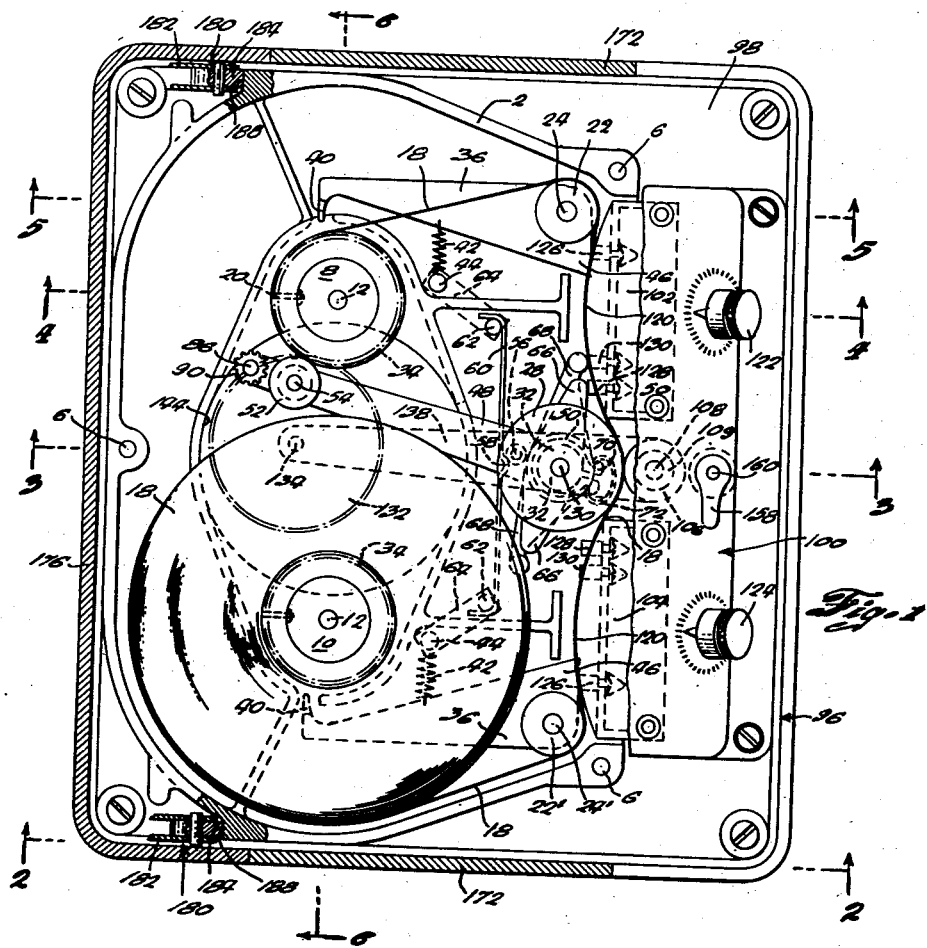
Fig. 1 is a top cross-sectional view of the apparatus of the present invention with a magazine in operative position thereon taken along the line 1—1 of Fig. 2 but with one closure in open position and with the top of the magazine removed.
Figure 2:
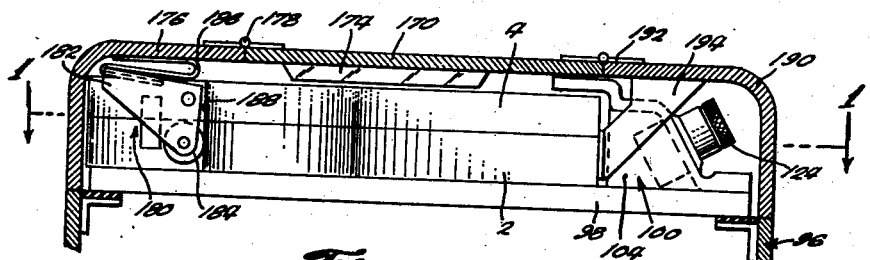
Fig. 2 is a side cross-sectional view taken along the line 2—2 of Fig. 1 but showing both closures in closed position, the magazine being held slightly out of operative position.
Figure 3:
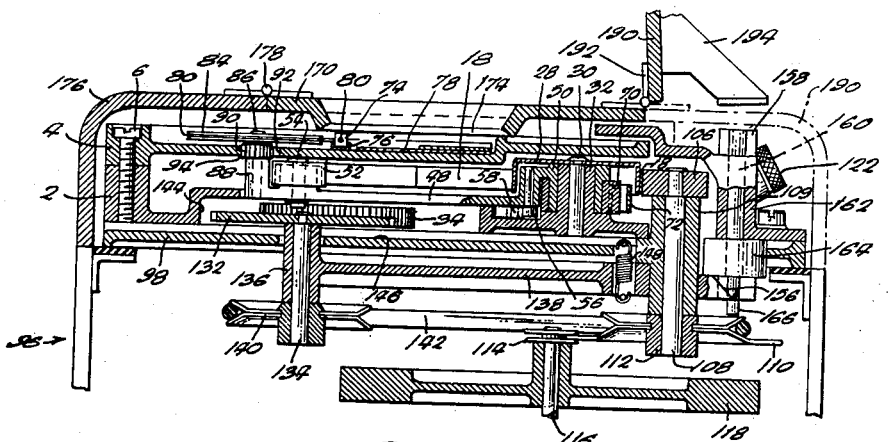
Fig. 3 is a side cross-sectional view taken along the lines 3—3 of Fig. 1.
Figure 4:
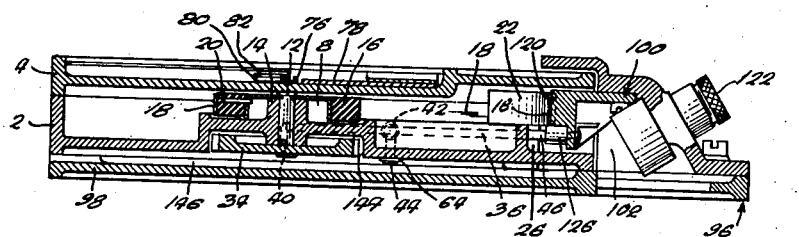
Fig. 4 is a side cross-sectional view taken along the line 4—4 of Fig. 1 but without the cover and closure portions of the apparatus.
Figure 5:
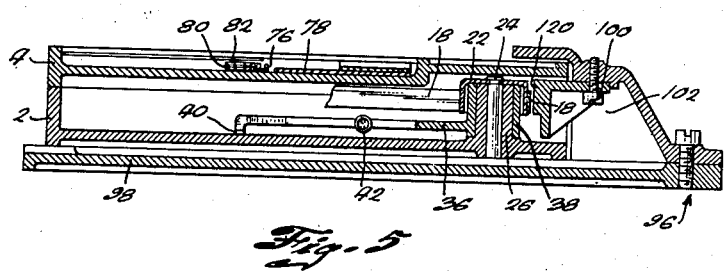
Fig. 5 is a view similar to Fig. 4 but taken along the lines 5—5 of Fig. 1.

The magazine of the present invention comprises a casing having a bottom portion 2 and a top portion 4, the two portions being held together by screws 6 or other appropriate securing elements. A pair of cup-shaped spools 8 and 10 are provided, each being mounted on pins 12 which are in turn rotatable within sleeves 14 inside the casing, the cup-shaped spools being surrounded by plastic or rubber rings 16 to which the free ends of the transducing medium 18 are secured by means of pins 20, the transducing medium 18 thus being wound on and between both of the spools defined by the cup-shaped members 8 and 10 and the plastic or rubber rings 16, the medium 18 extending from the first spool 8 around a guide roller 22 rotatably mounted on pin 24 in sleeve 26, thence across the open front of the magazine over pressure roller 28 mounted on pin 30 in sleeve 32, thence around guide roller 22' rotatably mounted on pin 24' and thence to the spool 10.

Toothed wheels 34 are fixed to the rotatable pins 12 at the bottom of the sleeves 14 and hence are rotatable with the spools. Spool rotation restraining members in the form of levers 36 are rotatably mounted on the sleeves 26 by means of hubs 38 and are provided with fingers 40 engageable between the teeth of the wheels 34 so as to restrain those wheels from rotation. Springs 42 are active between the levers 36 and studs 44 on the casing so as to urge the levers 36 into their position in engagement with the wheels 34, in which position they positively prevent rotation of those wheels and hence positively prevent rotation of the spools 8 and 10. Each of the levers 36 is provided with an offset portion 46 which, as will be explained more in detail hereinafter, is engageable by an element on the apparatus when the magazine is moved into operative position thereon, so as to cause the levers 36 to pivot outwardly from their engaged rotation-restraining position as illustrated in Fig. 7 to the position illustrated in Fig. 1 in which the fingers 40 have been disengaged from the wheels 34, thus permitting the spools 8 and 10 to rotate.

An arm 48 is pivotally mounted on sleeve 32 by means of hub 50 and extends inwardly from the pin 30 between the spools 8 and 10. A roller 52 is mounted on pin 54 and is adapted to engage the medium 18 on either one of the spools 8 and 10. A pin 56 is provided on the arm 48 near the pin 30, the pin 56 being acted upon by protruding portion 58 of spring 60, the ends of which are secured to studs 62 structurally and electrically connected to the studs 44 by means of brackets 64. The action of the protruding portion 58 of the spring 60 on the pin 28 is of the overcenter or toggle type and hence the arm 48 will be urged in one direction or the other so that the roller 52 will make contact with the medium 18 on one of the spools 8 or 10 depending upon which of those spools has the least amount of medium thereon. As illustrated, the spool 8 has the least amount of medium thereon and the arm 48 is urged by the spring 60 into engagement therewith. As the spool 8 is rotated to wind the medium thereon, the arm 48 will be moved away from the spool 8 against the action of the spring 60 until the amount of medium on the spool 8 is sufficient to cause the arm 48 to move past its central position, at which time the spring 60 will then urge the arm 48 into engagement with the medium 18 on the spool 10, that spool then having a lesser amount of medium wound thereon.

A first lever 66 preferably formed integral with the hub 50 extends to either side of the hub 50. A second lever 68 extending to either side of the arm 48 has a hub portion 70 which is frictionally mounted on the hub 50 of the arm 48 by means of spring 72. The ends of the second lever 68 preferably extend out beyond the ends of the lever 66. These levers are adapted, as will be described more in detail hereafter, to actuate suitable controls in accordance with the amount of medium wound on the spools 8 or 10, the levers being moved by the arm 48 to which they are operatively connected.

In order to facilitate use of the apparatus it is desirable that the user be able to have some means of knowing what particular point on the transducing medium 18 is being acted upon by the operative transducing element. This is necessary in order to make proper erasures, to cause a new recording to start where the previous recording has finished, to enable reproduction only of a desired portion of the recorded intelligence, and the like. Accordingly, an indicating member 74 is provided on the top of the magazine, that member taking the form of a small block slidable within track 76 adjacent to a piece of slate or paper 78 on which desired marks can be made. The element 74 is connected at either end to a driving element in the form of an endless wire or string 80 which extends around guide pulleys 82 at either side of the magazine and also extends around enlarged pulley 84 mounted on pin 86 which is in turn rotatably received in sleeve 88 at the free end of the arm 48. Secured to the pin 86 below the pulley 84 is gear 90 which is movable within slot 92 in the top 2 of the magazine and is engageable with stationary rack 94 formed in one edge of that slot 92. Hence, as the arm 48 pivots in accordance with the amount of medium on either one of the spools 8 or 10, the pulley 84 will translate therewith and hence will move the driving element 80 and the indicating member 74.

At the same time that the pulley 84 translates, it will also rotate because of the rotation of the gear 90 with respect to the stationary rack 94 and hence additional movement will be imparted to the indicating member 74. As a result, although the arm 48 may cause translation of the pulley 84 only over a small fraction of the length of the magazine, the rotation of the pulley 84 will cause the indicating element 74 to move a much greater distance, across substantially all of the length of the magazine, thus giving rise to a more precise and accurate indication.

The apparatus

The apparatus with which the magazine is useable is here specifically disclosed only with regard to those features thereof which are necessary to an understanding of the present invention. Conventional or non-necessary features such as the use of a motor for driving and the electrical connections employed for controlling the operation of the motor, for accomplishing the transducing action, and for achieving the necessary controls, are not specifically shown since they are relatively conventional in the field and may take a wide variety of forms without affecting the present invention in the slightest.

The apparatus comprises a frame generally detsignated 96 including a table or other surface 98 on which the magazine is positionable and a transducing housing generally designated 100 at one end of the table 98. The housing comprises, in the embodiment here specifically illustrated for use with multiple lane recording, a pair of sub-housings 102 and 104 each containing a transducing head of any appropriate construction, the sub-housings being separated by driving roller 106 mounted on shaft 108 which has flanged pulley 110 secured thereto via resilient bushing 112, the flanged portion of the pulley being receivable within and driven by pulley 114 connected to shaft 116 which is driven in any appropriate manner by a motor (not shown). A fly wheel 118 may also be secured to the shaft 116 in order to achieve increased smoothness of operation. The driving pulley 106 is adapted, when the magazine is placed in operative position, to enter the open end of the magazine and cause the elongated medium 18 to be engaged between itself and the roller 28 in the magazine, rotation of the driving roller 106 in either direction causing the medium 18 to unwind from one spool 8, 10 or the other. Each of the sub-housings 102 and 104 is provided with a curved guide surface 120 adapted to engage and support the portions of the elongated medium 18 between the guide rollers 22 and 22' and the roller 28, the transducing heads in the sub-housings 102 and 104 cooperating in any appropriate manner with the medium 18 as it passes over the guide surfaces 120, preferably by projecting out through apertures in the surfaces 120 into engagement with the medium 18. When multiple lane transducing is employed, the transducing heads are vertically positionable by any desired apparatus to correspond to the land transducing of which is desired.

The housing 100 is also provided with appropriate manually operable controls such as the reproducing volume control knob 122 and the recording volume control knob 124. Each of the sub-housings 102 and 104 (and it will be remembered that when one lane recording is employed only one such sub-housing will be required) is provided with control mechanism cooperable with the levers 66 and 68 in the magazine to appropriately condition the apparatus to the amount of medium 18 remaining on the spool. This control mechanism could, if desired, be mechanicaly actuated but in the form here specifically disclosed, it is electrically actuated. The control apparatus itself is not specifically illustrated, since it may take any desired form, but the arrangement of control contacts illustrated is particularly adapted and designed to actuate a suitable warning signal, such as a light or buzzer, when only a predetermined amount of medium remains on the spool having the least medium thereon and then to actuate a solenoid or other apparatus for automatically stopping the motor when the amount of medium on the spool being unwound reaches an irreducible minimum.

To this end, each of the sub-housings 102 and 104 is provided with an energizing contact 126 electrically connected to one end of the warning signal and the solenoid or other apparatus for stopping the motor and with first and second control contacts 128 and 130 respectively, the first control contact 128 being connected to the other end of the solenoid or other motor stopping mechanism and the second control contact 130 being electrically connected to the other end of the warning signal. In the magazine, the levers 36 are metallic, as are the springs 42, the studs 44, the brackets 64, the studs 62, the spring 60, the pin 56, the arm 48, and the levers 66 and 68, so that an electrical path is defined within the magazine from each of the levers 36 to the levers 66 and 68. When the magazine is in operative position on the apparatus, the energizing contacts 126 engage the offset portions 46 of the levers 36 so as to make electrical connection therewith and also to cause the levers 36 to pivot to their non-engaged position as shown in Fig. 1. The levers 66 and 68 are so positioned that as the arm 48 pivots, the end of the lever 68, which thus constitutes a second circuit closing contact, will engage and make electrical connection with the second control contact 130, thus closing the circuit through the warning signal and energizing whatever warning may be considered appropriate. As the operation of the apparatus continues, more of the elongated medium 18 will be wound from one of the spools 8, 10 and hence the arm will continue to pivot until the lever 66, which constitutes a first circuit closing contact, engages and makes electrical connection with the first control contact 128, thus closing the circuit to the solenoid or other apparatus and stopping the motor. During the latter portion of this movement, the lever 68 remains stationary with respect to the apparatus since it is in engagement with the second control contact 130. Hence it pivots with respect to the arm 48 and the lever 66 so that its opposite end is moved to a position in advance of the opposite end of the lever 66. Therefore, when motion of the elongated medium 18 is next initiated in an opposite direction, and hence when the arm 48 pivots toward the opposite spool 10, 8, the lever 68 will still engage with the second control contact 130 on the opposite side of the apparatus before the lever 66 engages the first circuit closing contact 128. In this way, the warning signal is always and automatically energized a predetermined interval before the motor is stopped no matter what the direction of motion of the medium 18.

The medium 18 is positively moved past the transducing heads by reason of rotation of the driving pulley 106 and hence is unwound from the appropriate spool without any additional mechanism being necessary. However, a take-up drive must be provided active upon the spool upon which the medium is to be wound so as to rotate that spool and wind the medium thereupon. This take-up mechanism takes the form of a gear 132 positioned above the table 98 and mounted on shaft 134 rotatable within sleeve 136 carried on arm 138 pivotable about the bearing 109 within which shaft 108 is rotatable, the lower end of the shaft 134 having pulley 140 secured thereto, the pulley 140 being drivingly connected with the flange pulley 110 by means of flexible belt 142. Consequently, whenever the driving pulley 106 is rotated, the gear 132 will rotate also. The gear 132 is centrally positioned on the table 98 and is movable, by pivoting the arm 138, from side to side until it is in engagement with one or the other of the toothed wheels 34 associated with the spools 8 and 10. The gear 132 is also positionable centrally between and simultaneously out of engagement with both the toothed wheels 34. The spools 8 and 10 will be selectively rotated for take-up purposes depending upon whether the gear 132 is in operative engagement with their respective toothed wheels 34.

The toothed wheels 34 are exposed on the underside of the magazine in recess 144 so as not to interfere with free slidability of the magazine onto the apparatus. The take-up driving gear 132 is receivable in the same recess 144 between the toothed wheels 34. In order to further facilitate removal or replacement of the magazine in the apparatus, the gear 132 is also receivable within recess or channel 146 on the table 98, the gear 132 being movable downwardly into that channel 146, in which position it is below the upper level of the table 98 and hence does not interfere with motion of the magazine therealong.

The mechanism for accomplishing the positioning of the gear 132 is best shown in Figs. 8 through 13. The arm 138 is not only pivotable about bearing 109 but is also movable axially therealong, being urged to upward position by means of spring 148 active between the table 98 and the arm 138. The tail of the arm 138 is provided with a slot 150 and with a cammed surface generally designated 152 having a central raised portion 154 and lateral lowered portions 156. A manually operable member in the form of a handle 158 is exposed on the top of the housing 100, the handle being secured to and rotating shaft 160 mounted in sleeve 162. The shaft passes through and controls switch 164 which determines the direction of rotation of the motor and has an eccentric pin 166 at the bottom thereof receivable within the slot 150 in the tail of the arm 138. Hence, rotation of the handle 158 causes the arm 138 to pivot.

The handle 158 may assume one of three positions. The intermediate position is illustrated in Figs. 8, 9 and 10, the eccentric pin 166 being in line between the axis of shaft 160 and the pivotal axis of the arm 138. As a result, the arm 138 assumes an intermediate position in which the gear 132 is disposed between and out of engagement with both of the toothed wheels 34. In this position, a second pin 168 eccentrically secured to the shaft 160 is in engagement with the raised cam surface 154, thus forcing the arm 138 downwardly as viewed in Fig. 9 so that the gear 132 is received within the channel 146. When in this position, the top of the gear 132 is below the top surface of the table 98 and hence the magazine may be freely placed in position on the apparatus. At the same time, the switch 164 is positioned to deenergize the motor. The handle 158 is also adapted to be placed in a pair of extreme positions, one on each side of the intermediate position just described, one of which is illustrated in Figs. 11 and 12. Rotation of the handle 158 to this extreme position causes the eccentric pin 166 to pivot the arm 138 so as to bring the gear 132 into engagement with one of the toothed wheels 34 corresponding to the spool which is to act as a take-up spool. At the same time, the pin 168 is moved so as to engage one of the lower cam surfaces 156 and hence the arm 138 is permitted to move upwardly under the influence of the spring 148 until the gear 132 moves out of the channel 146 and projects above the top surface of the table 98 and into the recess 144 in the bottom of the magazine. In this position, the switch 164 is energized so as to drive the motor in a direction appropriate to utilizing the spool with which the gear 132 is operatively connected as the take-up spool. The other extreme position of the handle 158 is illustrated in Figs. 13 and 14. Comparing this position with the position of Figs. 11 and 12 it will be apparent that since the eccentric pin 166 is on the opposite side of the axis of the shaft 160, the arm 138 will be pivoted in the opposite direction, the engagement of pin 168 with the other lower cam surface 156 permitting the arm 138 to move upwardly under the influence of the spring 148 so that the gear 132 can mesh with the toothed wheel 34 of the other spool.

The housing 100 is positioned on one side of the table 98. A fixed cover 170 is provided on the apparatus, being connected to the remainder of the apparatus by means of side walls 172, that cover being provided with a window 174 through which the indicating member 74 and the data sheet 76 are accessible, the table 98 and the top cover 170 defining an open-ended channel into which the magazine is insertable and from which the magazine is removable. The open end of the channel opposite from the housing 100 is provided with a closure 176 hinged at 178 to the top wall 170. The inside of this closure 176 carries a pair of resilient pressure members generally designated 180 and each here illustrated in the form of a U-shaped bracket 182 within which a roller 184 is rotatably mounted, the bracket 182 being secured to the underside of the closure 176 by means of spring 186. The sides of the magazine are provided with shoulders 188 against which the rollers 184 are engageable. Whenever the closure 176 is in closed position, as here illustrated, the resilient pressure members 180 will engage the magazine and force it toward the housing 100, the apparatus and magazine being so cooperatingly designed that the pressure members 180 will be active, if permitted, to force the magazine into operative position in which the energizing contacts 126 engage and pivot the levers 36, the elongated medium 18 is in engagement with the guide surfaces 120, and in which the driving roller 106 presses the medium 18 between itself and the roller 28 in the magazine. Hence, merely moving the closure 176 to its closed position will ensure that the magazine will be properly operatively positioned in the apparatus.

When the magazine is so positioned, some strain is placed upon the elongated medium 18. It is often desired to have the apparatus in stand-by condition, with the magazine inserted therein, over a long period of time, and in order to increase the life of the elongated medium 18 and prevent the possibility of its being distorted by remaining under tension or compression for any long period of time, and further in order to provide an apparatus which may be completely enclosed when not in use, I provide a second closure 190 hingedly secured at 192 to the fixed cover 170 and adapted when in closed position to completely enclose and cover the housing 100. Fixedly secured to the closure 190 are a pair of stops 194 adapted, when the second closure 190 is in closed position, to engage the front edge of the magazine and hold said magazine out of operative position, the energizing contacts 126 not pivoting the levers 36 so that rotation of the spools 8 and 10 is still prevented, and the medium 18 in the magazine remaining in unstressed condition. Whenever transducing is desired, the mere lifting of the closure 190 to open position will expose the manual controls for the apparatus and at the same time permit the resilient pressure members 180 to press the magazine into operative position.

Operation

The functioning and operation of my apparatus and magazine will in the main be apparent from the above description. When it is desired to load a magazine into the apparatus, the handle 158 will be in its intermediate position and hence the motor will be de-energized and the take-up gear 132 will be in the position illustrated in Fig. 9 in which it will not interfere with free sliding of the magazine over the table 98. After the magazine has been slid most of the way in, the closure 176 can be moved to closed position, after which the magazine can be retained in the apparatus but out of operative position so that the spool rotation restraining members 36 will still be effective to prevent undesired rotation of either of the spools 8 or 10 and so that the elongated medium 18 will be in unstressed condition. Whenever it is desired to record or reproduce, the second closure 190 may be opened, thus automatically exposing the manual controls and causing the magazine to move into operative position. The handle 158 is then moved to either one of its extreme positions, depending upon the desired direction of motion of the transducing medium, this in turn being determined by the land transducing of which is desired, the transducing head being approximately positioned with regard to the desired lane. This will cause the take-up gear 132 to move upwardly and sidewardly into meshing engagement with the toothed wheel 34 on the spool 8 or 10 which is to be the take-up spool. At the same time, the motor will rotate the driving roller 106 and hence will move the medium 18 past the transducing head and at the same time cause rotation of the take-up gear 132 through the slippable connection defined by the transmission belt 142 so as to cause the appropriate spool to wind the transducing medium thereupon.

As transducing takes place, the arm 48, which is in engagement with the spool having the least medium thereon and hence with the take-up spool at this stage of the operation, will be pivoted as medium is wound upon the take-up spool, causing rotation of gear 90 and of pulley 84 and moving the indicating member 74 across the magazine.

As soon as the take-up spool has more medium wound thereon than the other spool, or as soon as the spool with which the roller 54 on the arm 48 is in engagement has sufficient medium thereon to cause the arm 48 to pivot past its central position, the arm will then be moved, by the action of the spring 60, into engagement with the other spool. As the medium on that spool becomes depleted, the arm 48 will continue to pivot until the lever 68 makes contact with the second control contact 130, thus energizing a warning signal. As operation continues the lever 68 will slip with respect to the arm 48 until the lever 66 makes contact with the first control contact 128, thus energizing an appropriate control circuit such as a solenoid which will stop the motor.

The handle 158 may then be placed in its intermediate position permitting removal of the magazine or it may be moved to its operative extreme position, in which case the direction of motion of the elongated medium 18 in the magazine will be reversed, the operations proceeding as above described.

It will be apparent that many variations may be made in the specific design of the apparatus and magazine here disclosed without departing from the spirit of the invention as defined in the following claims.

I claim:

1. A magazine for an elongated medium comprising a casing, a pair of spools mounted therein on and between which said medium is wound, an arm articulately mounted in said casing so as to be engageable with the medium on said spools, a spring active on said arm to urge said arm into engagement with one or the other of said spools, a first lever on said arm and a second lever movably mounted on said arm, said levers extending from said arm so as to engage and actuate controls as the medium on the spool with which the arm is in contact becomes depleted.

2. A magazine for an elongated medium comprising a casing, a pair of spools mounted therein on and between which said medium is wound, an arm articulately mounted in said casing so as to be engageable with the medium on said spools, a spring active on said arm to urge said arm into engagement with one or the other of said spools, a first lever fixed to said arm and a second lever mounted on said arm so as to be movable between positions in advance of said first lever with respect to motion of said arm in either direction, said levers extending from said arm so as to engage and actuate controls as the medium on the spool with which the arm is in contact becomes depleted, said second lever actuating its control before said first lever actuates its control.

3. An apparatus for cooperating with an elongated medium comprising a frame, two separated pair of control elements on said frame, a magazine containing an elongated medium arrangeable on said frame, said magazine comprising a casing, a pair of spools mounted therein on and between which said medium is wound, an arm articulately mounted in said casing so as to be engageable with the medium on said spools, a spring active on said arm to urge said arm into engagement with one or the other of said spools, a first lever on said arm and a second lever movably mounted on said arm, the pairs of said control elements on said frame being on opposite sides of said arm, movement of said arm toward either spool a sufficient distance causing said levers to sequentially engage the control elements of the appropriate pair and thus sequentially actuate appropriate controls.

4. An apparatus for cooperating with an elongated medium comprising a frame, two separated pair of control elements on said frame, a magazine containing an elongated medium arrangeable on said frame, said magazine comprising a casing, a pair of spools mounted therein on and between which said medium is wound, an arm articulately mounted in said casing so as to be engageable with the medium on said spools, a spring active on said arm to urge said arm into engagement with one or the other of said spools, a first lever fixed to said arm and a second lever mounted on said arm so as to be movable between positions in advance of said first lever with respect to motion of said arm in either direction, movement of said arm toward one of said spools a sufficient distance causing said second lever to engage one of the control elements of the appropriate pair; further movement of said arm in the same direction causing relative movement of said arm and said second lever at least until said first lever engages the other of the control elements of said appropriate pair, thus advancing said second lever relative to said first lever with respect to the opposite direction of motion of said arm, thereby sequentially actuating appropriate controls.

5. An apparatus cooperating with an elongated medium comprising a frame, an energizing contact on said frame, a control contact on said frame, an electric control apparatus connected between said contacts, a magazine containing an elongated medium arrangeable on said frame, said magazine comprising a casing, a cooperating contact engageable with said energizing contact whenever said magazine is in operative position on said frame, and a circuit closing contact the position of which in said magazine is controlled by the medium in said magazine, said circuit closing contact being movable into engagement with said control contact at an appropriate time, said cooperating and circuit closing contacts being electrically connected, engagement between said circuit closing contact and said control contact closing the circuit to and actuating said electric control.

6. An apparatus for cooperating with an elongated medium comprising a frame, an energizing contact on said frame, a control contact on said frame, an electric control apparatus connected between said contacts, a magazine containing an elongated medium arrangeable on said frame, said magazine comprising a casing, a pair of spools mounted therein on and between which said medium is wound, a cooperating contact engageable with said energizing contact whenever said magazine is in operative position on said frame, an arm articulately mounted in said casing so as to be engageable with the medium on said spools, a spring active on said arm to urge said arm into engagement with one or the other of said spools, and a circuit closing contact on said arm engageable with said control contact whenever said arm has moved a sufficient distance toward one of said spools as the medium on said spool becomes depleted, said cooperating and circuit closing contacts being electrically connected, engagement between said circuit closing contact and said control contact closing the circuit to and actuating said electric control.

7. An apparatus for cooperating with an elongated medium comprising a frame, an energizing contact on said frame, first and second control contacts on said frame, first and second electric control apparatus connected between said energizing contact and said first and second control contacts respectively, a magazine containing an elongated medium arrangeable on said frame, said magazine comprising a casing, a cooperating contact engageable with said energizing contact whenever said magazine is in operative position on said frame, a pair of spools in said magazine on and between which said medium is wound, an arm articulately mounted in said casing so as to be engageable with the medium on said spools, a spring active on said arm to move said arm into engagement with one or the other of said spools, a first circuit closing contact on said arm and a second circuit closing contact mounted on said arm so as to be movable between positions in advance of said first circuit closing contact with respect to motion of said arm in either direction, movement of said arm toward one of said spools a sufficient distance causing said second circuit closing contact to engage said second control contact, further movement of said arm in the same direction causing relative movement of said first and second circuit closing contacts at least until said first circuit closing contact engages said first control contact, said cooperating and circuit closing contacts being electrically connected, engagement between said circuit closing contacts and the corresponding control contacts closing the circuit to and actuating the corresponding electric controls.

8. An apparatus for cooperating with an elongated medium comprising a frame, an energizing contact on said frame, first and second pairs of control contacts on said frame, each pair comprising first and second control contacts, first and second electric control apparatus connected between said energizing contact and the first and second control contacts of said first and second pairs, a magazine containing an elongated medium arrangeable on said frame, said magazine comprising a casing, a pair of spools mounted therein on and between which said medium is wound, a cooperating contact engageable with said energizing contact whenever said magazine is in operative position on said frame, an arm articulately mounted in said casing so as to be engageable with the medium on said spools, a spring active on said arm to move said arm into engagement with one or the other of said spools, a first circuit closing contact on said arm, a second circuit closing contact movably mounted on said arm, the first and second pairs of control contacts on said frame being on opposite sides of said arm, movement of said arm toward one of said spools a sufficient distance causing said second circuit closing contact to engage the second control contact of the appropriate one of said pairs, further movement of said arm in the same direction causing relative movement of said arm and said second circuit closing contact at least until said first circuit closing contact engages said first control contact of said pair, thus advancing said second circuit closing contact relative to said first circuit closing contact with respect to the opposite direction of motion of said arm, movement of said arm toward the other of said spools causing sequential engagement of said second and first circuit closing contacts with the corresponding control contacts of said other pair, said energizing contact being electrically connected to said first and second circuit closing contacts, engagement between said first and second circuit closing contacts and said first and second control contacts respectively closing the circuit to and actuating said first and second electric controls.

9. In the apparatus of claim 5, said magazine comprising a medium-motion-restraining member movably mounted in said casing and normally active on said medium to prevent its rotation, said member being operatively connected to and moved to inoperative position by said energizing contact when said magazine is in operative position on said frame.

10. In the apparatus of claim 6, said magazine comprising a spool-rotation-restraining member pivotally mounted in said casing and normally engaged with a spool to prevent its rotation, said member being electrically connected to said circuit closing contact and being operatively connected to and moved to non-rotation-restraining position relative to said spool by said energizing contact when said magazine is in operative position on said frame.

11. A magazine containing an elongated medium comprising a casing, a pair of spools rotatably mounted therein on and between which said medium is wound, an arm articulately mounted in said casing so as to be engageable with the medium on said spools, a spring active on said arm to urge it into engagement with the medium on one of said spools, a gear on said arm, a rack on said casing with which said gear is engaged, said gear rotating as said arm moves corresponding to the amount of medium on the spool with which it is engaged, an indicating member on said magazine to show the amount of medium which was wound on or unwound from a spool, and an operative connection between said indicating member and said gear so that rotation and movement of said gear positions said indicating member.

12. A magazine containing an elongated medium comprising a casing, a pair of spools rotatably mounted therein on and between which said medium is wound, an arm articulately mounted in said casing so as to be engageable with the medium on said spools, a spring active on said arm to urge it into engagement with the medium on one of said spools, a gear on said arm, a rack on said casing with which said gear is engaged, said gear rotating as said arm moves corresponding to the amount of medium on the spool with which it is engaged, an indicating member on said magazine to show the amount of said medium which has been wound on or unwound from a spool, a driving element for said indicating member, and a pulley on said arm and rotatively connected to said gear, said driving element being engaged with said pulley, said pulley moving with said arm and rotating with said gear to position said indicating member.

13. A magazine for an elongated medium comprising a casing, a pair of spools rotatably mounted therein on and between which said medium is wound, an arm articulately mounted in said casing so as to be engageable with the medium on said spools, a spring active on said arm to urge it into engagement with the medium on one of said spools, a gear on one end of said arm, a rack on said casing with which said gear is engaged, said gear rotating as said arm moves corresponding to the amount of medium on the spool with which it is engaged, an indicating member on said magazine to show the amount of medium which is wound on or unwound from a spool, a driving element for said indicating member, and a pulley on said arm and rotatably connected to said gear, said driving element being engaged with said pulley, said pulley moving with said arm and rotating with said gear to position said indicating member, a first lever fixed to said arm at the other end thereof from said gear, a second lever mounted on said arm adjacent said first lever so as to be movable with respect to said arm between positions in advance of said first lever with respect to motion of said arm in either direction, said levers being adapted to actuate controls as the medium on the spool with which the arm is in contact with becomes depleted, said second lever actuating its control before said first lever actuates its control.

References Cited in the file of this patent

UNITED STATES PATENTS

| Number | Name | Date |
|---|---|---|
| 2,089,330 | Becker | Aug. 10, 1937 |
| 2,096,445 | Begun | Oct. 19, 1937 |
| 2,326,654 | Jagust | Aug. 10, 1943 |
| 2,374,038 | Ress | Apr. 17, 1945 |
| 2,419,476 | Begun | Apr. 22, 1947 |
| 2,584,734 | Owens | Feb. 5, 1952 |